United States Patent
Li et al.

(10) Patent No.: US 9,485,137 B2
(45) Date of Patent: Nov. 1, 2016

(54) ONLINE RECONFIGURATION TRANSITION SYNCHRONIZATION

(71) Applicant: Futurewei Technologies, Inc., Plano, TX (US)

(72) Inventors: Qiaojie Li, Shenzhen (CN); Xiaoyue He, Shenzhen (CN); Xiang Wang, Shenzhen (CN); Cao Shi, Shenzhen (CN); Amir H. Fazlollahi, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 114 days.

(21) Appl. No.: 14/464,489

(22) Filed: Aug. 20, 2014

(65) Prior Publication Data

US 2015/0055449 A1  Feb. 26, 2015

Related U.S. Application Data (60) Provisional application No. 61/868,337, filed on Aug. 21, 2013.

(51) Int. Cl.
  *H04B 3/16* (2006.01)
  *H04L 12/24* (2006.01)
  (Continued)

(52) U.S. Cl.
  CPC .......... *H04L 41/0672* (2013.01); *H04L 1/007* (2013.01); *H04L 1/0072* (2013.01);
  (Continued)

(58) Field of Classification Search
  CPC . H04L 41/0672; H04L 1/0072; H04L 1/007; H04L 43/0817; H04L 43/0847; H04L 5/0046; H04L 27/3416; H04M 11/062
  See application file for complete search history.

(56) References Cited

U.S. PATENT DOCUMENTS 7,856,033 B2 * 12/2010 Oksman ................ H04L 5/1446
                                                370/465
8,717,862 B2 *  5/2014 Xu ........................... H04B 3/32
                                                370/201
(Continued)

FOREIGN PATENT DOCUMENTS

EP        1553743 A      7/2005
WO    2006081922 A1     8/2006

OTHER PUBLICATIONS

Foreign Communication From a Counterpart Application, PCT Application No. PCT/US2014/051918, International Search Report dated Oct. 28, 2014, 5 pages.
(Continued)

*Primary Examiner* — Phuc Tran
(74) *Attorney, Agent, or Firm* — Conley Rose, P.C.; Grant Rodolph; William H. Dietrich (57) ABSTRACT

An online reconfiguration method comprising communicating data transfer units (DTUs) using a subscriber line, monitoring the subscriber line for a line condition event, detecting the line condition event, wherein detecting the line condition event comprises determining whether the line condition triggers a threshold, sending an online reconfiguration request message that indicates a robust management channel (RMC) frame type in response to detecting the line condition event, wherein the RMC frame type is a normal RMC frame that comprises time marker information when the line condition event does not trigger the threshold, and wherein the RMC frame type is a special RMC frame that comprises time marker information when the line condition event triggers the threshold, receive an online reconfiguration response message that comprises the time marker information, and synchronizing a transition of one or more transmission parameters using the time marker information.

22 Claims, 7 Drawing Sheets

(51) Int. Cl.
*H04L 1/00* (2006.01)
*H04L 12/26* (2006.01)
*H04M 11/06* (2006.01)
*H04L 5/00* (2006.01)
*H04L 27/34* (2006.01)

(52) U.S. Cl.
CPC ......... *H04L 5/0046* (2013.01); *H04L 27/3416* (2013.01); *H04L 43/0817* (2013.01); *H04L 43/0847* (2013.01); *H04M 11/062* (2013.01)

(56) References Cited

U.S. PATENT DOCUMENTS

| | | | | |
|---|---|---|---|---|
| 8,982,934 | B2* | 3/2015 | Gupta | H04L 27/30 |
| | | | | 375/222 |
| 8,989,239 | B2* | 3/2015 | Schelstraete | H04L 1/1887 |
| | | | | 375/219 |
| 9,077,499 | B2* | 7/2015 | Chang | H04L 5/0053 |
| 2005/0147043 | A1* | 7/2005 | Schelstraete | H04L 5/0046 |
| | | | | 370/236 |
| 2006/0078044 | A1 | 4/2006 | Norrell et al. | |
| 2006/0176942 | A1* | 8/2006 | Oksman | H04L 1/0025 |
| | | | | 375/222 |
| 2008/0112472 | A1* | 5/2008 | Oksman | H04L 5/1446 |
| | | | | 375/222 |
| 2008/0260011 | A1 | 10/2008 | Peeters et al. | |
| 2009/0175156 | A1* | 7/2009 | Xu | H04B 3/32 |
| | | | | 370/201 |
| 2013/0279687 | A1* | 10/2013 | Wei | H04L 1/0002 |
| | | | | 379/350 |
| 2014/0247900 | A1* | 9/2014 | Maes | H04L 1/1607 |
| | | | | 375/295 |

OTHER PUBLICATIONS

Foreign Communication From a Counterpart Application, PCT Application No. PCT/US2014/051918, Written Opinion dated Oct. 28, 2014, 7 pages.

"Fast Access to Subscriber Terminals (FAST)—Physical Layer Specification," Draft Recommendation ITU-T G.9701 (New), Apr. 2014, 366 pages.

"Series G: Transmission Systems and Media, Digital Systems and Networks, Digital Sections and Digital Line System-Access Networks, Very High Speed Digital Subscriber Line Transceivers 2 (VDSL2)," ITU-T, Telecommunication Standardization Sector of ITU, G.993.2, Feb. 2006, 252 pages.

"Series G: Transmission Systems and Media, Digital Systems and Networks, Digital Sections and Digital Line System-Access Networks, Self-FEXT Cancellation (Vectoring) for use with VDSL2 Transceivers," ITU-T, Telecommunication Standardization Sector of ITU, ITU-T, Telecommunication Standardization Sector of ITU, G.993.5, Apr. 2010, 80 pages.

"Series G: Transmission Systems and Media, Digital Systems and Networks, Digital Sections and Digital Line System-Access Networks, Handshake Procedures for Digital Subscriber Line Transceivers," ITU-T, Telecommunication Standardization Sector of ITU, G.994.1, Jun. 2012, 900 pages.

* cited by examiner

ONLINE RECONFIGURATION TRANSITION SYNCHRONIZATION

CROSS-REFERENCE TO RELATED APPLICATIONS

The present application claims priority to U.S. Provisional Application No. 61/868,337 filed Aug. 21, 2013 by Qiaojie Li, et al., and entitled "Enhanced Online Reconfiguration," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern digital subscriber line (DSL) technologies, such as, asymmetric digital subscriber lines (ADSLs) and very high speed digital subscriber lines (VDSLs), may create communication systems that provide bi-directional, high-speed data transmission over twisted pair phone lines. In DSL communication systems, both downstream and upstream signals travel on the same pair of wires and may be separated from each other using a duplexing. A DSL communications system may be configured to implement a frequency division duplexing (FDD) to separate downstream data carrying signals from upstream data carrying signals. Alternatively, a DSL communication systems may be configured to implement a time division duplexing (TDD) to separate downstream signals from upstream signals when communicating data transfer units (DTUs). For instance, the International Telecommunications Union (ITU) draft G.9701/G.fast study may employ a synchronous TDD (STDD) where the wires may transmit data downstream or upstream, but not simultaneously. A DSL communications system may employ a robust management channel (RMC) to carry acknowledgements for received DTUs and delay-sensitive management data. An RMC may be protected using forward error coded (FEC) (e.g., Reed-Solomon (RS) FEC, or Trellis Coded Modulation (TCM) and/or other channel coding techniques) and bit loading of the RMC sub-carriers may be lower than the same sub-carriers in a data symbol. As such, an RMC may be more robust than a data channel. When there is a sudden and/or a sustained increase in noise, an online reconfiguration (OLR) scheme associated with an urgent change of bit loading and/or other modulation parameters may be used. An OLR acknowledgement may be signaled by the RMC. In some instances, when noise increases the RMC may break. For instance, disorderly leaving in a vectored system by a transceiver unit may change termination impedances on a wire pair and may affect the equal-level far-end crosstalk (EL-FEXT) properties between other wire pairs in one direction. Other abrupt and major change in signal-to-noise ratio (SNR), such as, crosstalk or prolonged impulse noises may disrupt an RMC. When noise in a DSL system increases suddenly, a burst of cyclic redundancy check (CRC) errors may occur in a receiver within the DSL system, which may cause the DSL modems to reset or retrain. In the presence of severe transient disturbances or powerful impulse noise, the RMC may be temporarily unreliable. When an RMC is broken, using the RMC for OLR acknowledgements may not be reliable and the corruption of the RMC may disrupt communication.

SUMMARY

In one embodiment, the disclosure includes an online reconfiguration method comprising communicating DTUs using a subscriber line, monitoring the subscriber line for a line condition event, detecting the line condition event, wherein detecting the line condition event comprises determining whether the line condition triggers a threshold, sending an online reconfiguration request message that indicates an RMC frame type in response to detecting the line condition event, wherein the RMC frame type is a normal RMC frame that comprises time marker information when the line condition event does not trigger the threshold, and wherein the RMC frame type is a special RMC frame that comprises time marker information when the line condition event triggers the threshold, receive an online reconfiguration response message that comprises the time marker information in response to the online reconfiguration request message, and synchronizing a transition of one or more transmission parameters using the time marker information.

In another embodiment, the disclosure includes an apparatus comprising a transceiver configured to couple to one or more subscriber lines, and a processor coupled to a memory and the transceiver, wherein the memory comprises computer executable instructions stored in a non-transitory computer readable medium such that when executed by the processor causes the processor to monitor the subscriber lines for a line condition event, detect the line condition event, determine when the line condition event triggers a threshold, send an online reconfiguration request message that requests a normal RMC frame that comprises time marker information when the line condition event does not trigger the threshold, send the online reconfiguration request message that requests a special RMC frame that comprises time marker information when the line condition event triggers the threshold, receive an online reconfiguration response message that comprises one or the normal RMC frame or the special RMC frame, and synchronize a transition of one or more transmission parameters using the time marker information.

In yet another embodiment, the disclosure includes an apparatus comprising a transceiver configured to couple to one or more subscriber lines, and a processor coupled to a memory and the transceiver, wherein the memory comprises computer executable instructions stored in a non-transitory computer readable medium such that when executed by the processor causes the processor to receive an online reconfiguration request message that indicates an RMC frame type, wherein the RMC frame type is one of a normal RMC frame or a special RMC frame, decode the online reconfiguration request message to determine the RMC frame type, send an online reconfiguration response message that comprises an RMC frame of the RMC frame type, wherein the RMC frame comprises time marker information, and synchronize a transition of one or more transmission parameters using the time marker information.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments for determining and/or implementing a time marker for an OLR synchronization. In an embodiment, a normal RMC may comprise time marker information for OLR synchronization and a special RMC may comprise time marker information for OLR synchronization when noise increases above a threshold and/or when an SNR margin is reduced. According to line conditions, a receiver may request for the transmitter to use a normal RMC frame or a special RMC frame to communicate time marker information for an OLR transition synchronization. Time marker information may indicate the start of an upstream and/or downstream OLR transition. Time marker information may include, but is not limited to, a down counter value, a start time value, an end time value, and a time delay. The receiver may monitor SNR, SNR margin, and/or the number of CRC anomalies of RMC sub-carriers for a period of time to predict the status of the RMC. Based on the status of the RMC, the receiver may determine a RMC frame type for an OLR synchronization. Determining an RMC frame type based on line conditions may enhance robustness against unpredictable noise increases.

Figure 1:
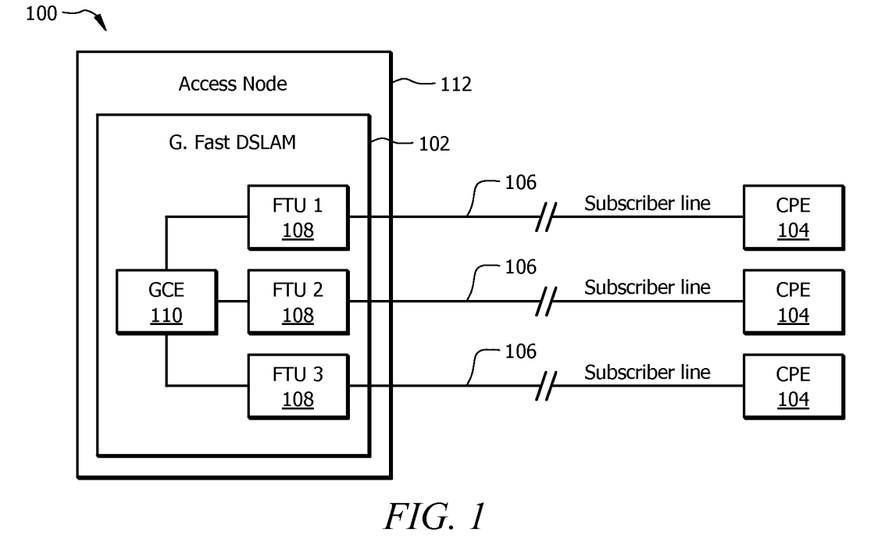
FIG. 1 is a schematic diagram of an embodiment of a DSL system.

FIG. 1 is a schematic diagram of an embodiment of a DSL system 100. The DSL system 100 may comprise an ADSL2 network, an ADSL2+ network, a VDSL2 network, and/or a G.fast network. The DSL system 100 comprises an access node 112 that comprises a G.fast DSL access multiplexer (DSLAM) 102 coupled to a plurality of customer premise equipments (CPEs) 104 via a plurality of subscriber lines 106. The access node 112 may be implemented as an exchange, a DSLAM, a cabinet, a remote terminal (RT), a distribution point, or any other suitable network device that interacts with the CPEs 104. The access node 112 may be operated by a network service provider. The G.fast DSLAM 102 may be configured to use a discrete multi-tone (DMT) modulation that allocates a plurality of bits for each sub-carrier or tone in each DMT symbol. The terms "tones" and "sub-carriers" may be used interchangeably throughout this disclosure. The DMT parameters may be adjusted to various channel conditions (e.g., insertion loss, noise, and disturbances) that may occur at each end of a subscriber line 106. The G.fast DSLAM 102 may comprise a G.fast control entity (GCE) 110, which may comprise a vectoring control entity (VCE), coupled to one or more of G.fast transceiver units (FTUs) 108. The GCE 110 may comprise other functional blocks, including but not limited to, a timing control entity (TCE) which are not further discussed here. The GCE 110 may be configured to communicate data and/or signaling commands to the FTUs 108 and/or between the FTUs 108 and receive data and/or signaling commands from the FTUs 108. The FTUs 108 may be configured to communicate (e.g., transmit and/or receive) user data and/or control signals between the G.fast DSLAM 102 and the CPEs 104 via the subscriber lines 106. A subscriber line 106 may be any suitable material (e.g., copper) and type (e.g., twisted pair). Additionally, one or more subscriber lines 106 may be constrained or bundled, for example, within a binder. A CPE 104 may be located at a customer premise and may be coupled to one or more electronic devices. For example, a CPE 104 may be coupled to a telephone, a computer, a television, any other suitable device as would be appreciated by one of ordinary skill in the art upon viewing this disclosure, or combinations thereof. A CPE 104 may comprise a router, a switch, a splitter, and/or a residential gateway (RG) which may couple one or more subscriber lines 106 to one or more electronic devices. Additionally, a CPE 104 may comprise a DSL transceiver, such as, a modem or a G.fast transceiver unit at a remote terminal (FTU-R). FIG. 1 comprises three FTUs and three CPEs for illustrative purposes, but a DSL system 100 may comprise any number of FTUs and/or CPEs.

Figure 2:
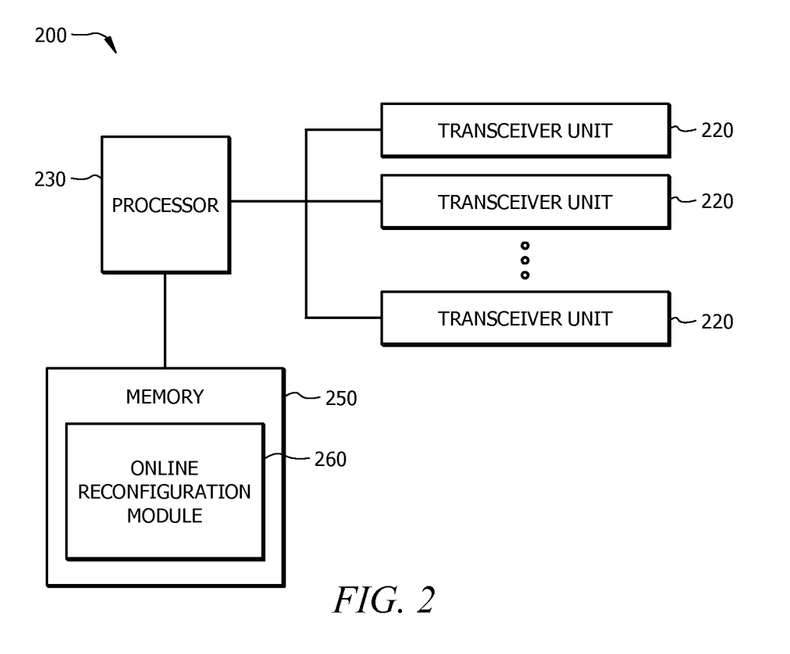
FIG. 2 is a schematic diagram of an embodiment of a network element.

FIG. 2 is a schematic diagram of an embodiment of a network element 200 that may be used to transport and process traffic through at least a portion of a DSL system 100 shown in FIG. 1. For example, network element may be configured similar to the access node 112, the G.fast DSLAM 102, and/or the CPE 104. At least some of the features/methods described in the disclosure may be implemented in the network element 200. For instance, the features/methods of the disclosure may be implemented in hardware, firmware, and/or software installed to run on the hardware. The network element 200 may be any device (e.g., a modem, a switch, router, bridge, server, client, etc.) that transports data through a network, system, and/or domain. Moreover, the terms network "element," network "node," network "component," network "module," and/or similar terms may be interchangeably used to generally describe a network device and do not have a particular or special meaning unless otherwise specifically stated and/or claimed within the disclosure. In one embodiment, the network element 200 may be an apparatus configured to communicate data within a DSL system, to monitor line conditions, to signal an online reconfiguration transition, and/or to implement an online reconfiguration. For example, network element 200 may be integrated within a CPE 104 and/or a G.fast DSLAM 102 as described in FIG. 1.

The network element 200 may comprise one or more transceiver units 220 (e.g., a transceiver at an operator side (FTU-O) and/or a transceiver at a remote terminal (FTU-R)), which may be transmitters, receivers, or combinations thereof. The transceiver units 220 may transmit and/or receive frames from other network nodes. A processor 230 may be coupled to the transceiver units 206 and may be configured to process the frames and/or determine which nodes to send (e.g., transmit) the frames. The network element 200 may comprise one or more transceiver units 220, which may be transmitters, receivers, or combinations thereof. The transceiver units 220 may transmit and/or receive frames from other network nodes from other network nodes. A processor 230 may be coupled to the transceiver units 220 and may be configured to process the frames and/or to determine which nodes to send (e.g., transmit) the frames.

A processor 230 may be coupled to the transceiver units 220 and may be configured to process the frames and/or determine which nodes to send (e.g., transmit) the packets. In an example embodiment, the processor 230 may comprise one or more multi-core processors and/or memory modules 250, which may function as data stores, buffers, etc. The processor 230 may be implemented as a general processor or may be part of one or more application specific integrated circuits (ASICs), field-programmable gate arrays (FPGAs), and/or digital signal processors (DSPs). Although illustrated as a single processor, the processor 230 is not so limited and may comprise multiple processors. The processor 230 may be configured to signal an online reconfiguration transition and/or to implement an online reconfiguration.

FIG. 2 illustrates that a memory module 250 may be coupled to the processor 230 and may be a non-transitory medium configured to store various types of data. Memory module 250 may comprise memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 250 may be used to house the instructions for carrying out the various example embodiments described herein. In one example embodiment, the memory module 250 may comprise an online reconfiguration module 260 that may be implemented on the processor 230. In one embodiment, the online reconfiguration module 260 may be implemented to signal an online reconfiguration transition and/or to implement an online reconfiguration. For example, the online reconfiguration module 260 may be configured to monitor for line condition events during showtime, to detect a line condition event, to determine the magnitude of a line condition event, and/or to signal an online reconfiguration transition. The online reconfiguration module 260 may be implemented for a transmitter (Tx), a receiver (Rx), or both.

It is understood that by programming and/or loading executable instructions onto the network element 200, at least one of the processors 230, the cache, and the long-term storage are changed, transforming the network element 200 in part into a particular machine or apparatus, for example, a multi-core forwarding architecture having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable will be produced in large volume may be preferred to be implemented in hardware (e.g., in an ASIC) because for large production runs the hardware implementation may be less expensive than software implementations. Often a design may be developed and tested in a software form and then later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read-only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Figure 3:
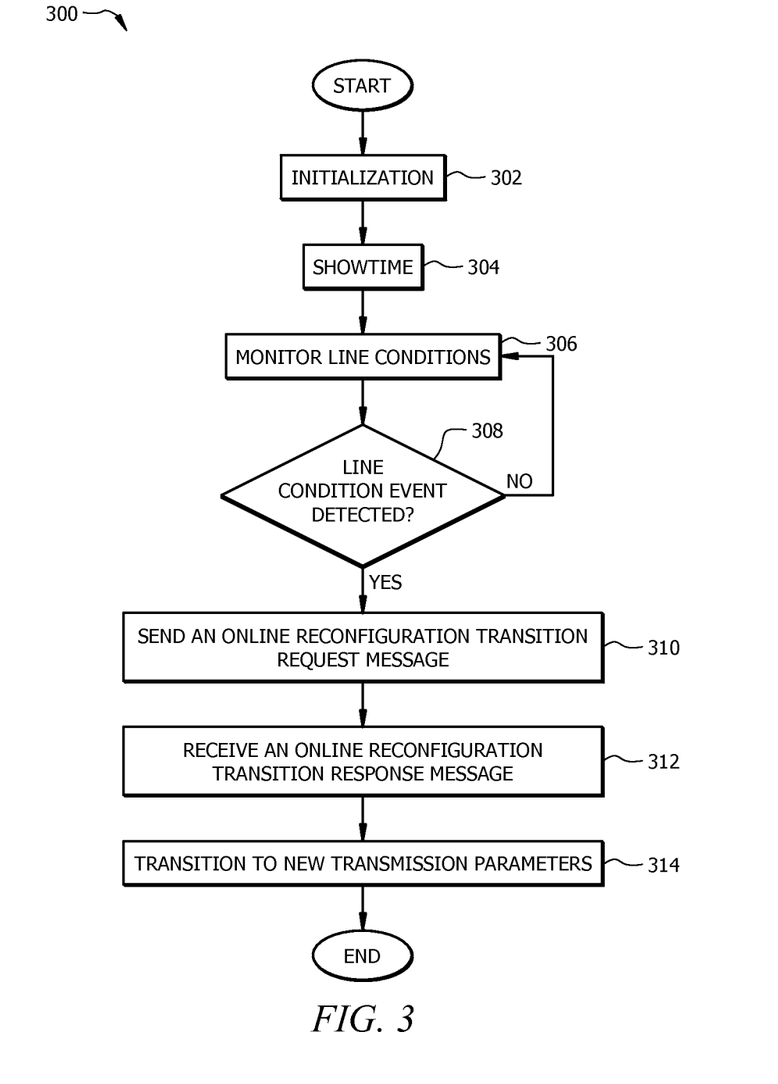
FIG. 3 is a flowchart of an embodiment of an online reconfiguration method for a receiver.

FIG. 3 is a flowchart of an embodiment of an online reconfiguration method 300 for a receiver and may be similar to the online reconfiguration module 260 described in FIG. 2. In an embodiment, a receiver (e.g., CPE 104 described in FIG. 1) may be configured to monitor line conditions between a transmitter (e.g., G.fast DSLAM 102 described in FIG. 1) and the receiver during showtime and to signal an online reconfiguration transition in response to detecting line condition changes. The receiver may determine and/or indicate an implementation for the online reconfiguration transition synchronization to the transmitter.

At step 302, method 300 may perform an initialization between the transmitter and the receiver. An initialization may comprise a handshake protocol and may introduce the transmitter and the receiver. During initialization, information (e.g., modem type) may be communicated between the transmitter and the receiver, a channel response may be measured, a channel quality (e.g., SNR) may be measured, and/or other operations for initializing data communication as would be appreciated by one of ordinary skill in the art upon viewing this disclosure. In an embodiment, initialization may be implemented as described in ITU standard G.994.1 entitled, "Handshake procedures for digital subscriber line transceivers" which is hereby incorporated by reference as if reproduced in its entirety. At step 304, method 300 may implement a showtime state to communicate data between the transmitter and the receiver. Showtime may be a mode (e.g., a data mode) where data is communicated between the transmitter and the receiver based on the channel quality. In an embodiment, showtime may be implemented as described in ITU G.993.2 entitled, "Very high speed digital subscriber line transceivers 2 (VDSL2)" and/or ITU draft G.9701 entitled, "Fast Access to Subscriber Terminals (FAST)—Physical layer specification," which are both hereby incorporated by reference as if reproduced in its entirety.

At step 306, method 300 may monitor the line condition of a subscriber line when communicating data during showtime. Monitoring the line conditions may include, but is not limited to, monitoring for tone degradation in a MEDLEY set, monitoring for an SNR degradation or increase, monitoring an SNR margin, monitoring for instances of CRC anomalies, and/or monitoring for any other line conditions as would be appreciated by one of ordinary skill in the art upon viewing this disclosure. Monitoring the line conditions may be performed continuously or for one or more periods of time (e.g., time windows). At step 308, method 300 may detect when a line condition event occurs. For example, method 300 may detect a line condition event when the SNR of an RMC sub-carrier degrades or increases, when an SNR margin is reduced or increased, when a number of CRC anomalies occur within a period of time, any other suitable criteria as would be appreciated by one of ordinary skill in the art upon viewing this disclosure, or combinations thereof. Further, method 300 may determine the severity or magnitude of a line condition event using one or more thresholds. A sudden (e.g., an impulse spike) or a prolonged noise increase in the line conditions may cause the magnitude of the line condition event to be sufficient to cross a threshold. An SNR threshold, an SNR margin threshold, a CRC number of instances threshold, and/or a monitoring period duration may be determined and/or set by a vendor or a network operator to determine the magnitude of a line condition event. For instance, a SNR threshold, a SNR margin threshold, a CRC number of instances threshold, and/or a monitoring period duration may configured in a management information base (MIB) as described in ITU standard G.993.2. Method 300 may determine the magnitude of a line condition event when the SNR of an RMC sub-carrier degrades below or exceeds a threshold, when an SNR margin is reduced below or exceeds a threshold, and/or when the number of CRC anomalies exceeds a threshold of instances (e.g., a threshold of about zero instances) within a period of time. When no line condition event is detected, method 300 may continue to monitor for line condition events as described in step 306.

At step 310, method 300 may send an online reconfiguration transition request message to the transmitter. The online reconfiguration transition request message may request to initiate an online reconfiguration transition. For instance, the receiver may request to reduce a bit loading table, gains, framing parameters, or any other suitable parameter as would be appreciated by one of ordinary skill in the art upon viewing this disclosure. The online reconfiguration transition request message may comprise an indicator field that identifies an RMC frame type to be used for synchronizing an online reconfiguration transition. For example, method 300 may send an online reconfiguration transition request message that indicates to use a normal RMC frame that comprises time marker information for synchronizing an online reconfiguration transition when a line condition event is detected, but does not trigger any thresholds. A normal RMC frame may be as described in ITU draft G.9701 entitled, "Fast Access to Subscriber Terminals (FAST)—Physical layer specification" which is hereby incorporated by reference as if reproduced in its entirety. Method 300 may send an online reconfiguration transition request message that indicates to use a special RMC frame that comprises time marker information for synchronizing an online reconfiguration transition when a line condition event is detected that triggers one or more thresholds and/or is sustained for a period of time. For example, the indicator field may be a one bit field or flag and may be set to a first value (e.g., a value of about zero) that indicates to use a normal RMC frame and a second value (e.g., a value of about one) that indicates to use a special RMC frame.

In an alternative embodiment, method 300 may send an online reconfiguration transition request message that indicates to use a syncflag or any other flags to communicate time marker information for synchronizing an online reconfiguration transition as would be appreciated by one of ordinary skill in the art upon viewing this disclosure, when a line condition event is detected and triggers one or more thresholds. The indicator field may comprise two or more bits and may be set to a first value (e.g., a binary value of about 00) to indicate using a syncflag, a second value (e.g., a binary value of about 11) to indicate using a normal RMC, a third value (e.g., a binary value of about 01) to indicate using a special RMC, and a fourth value (e.g., a binary value of about 10) to indicate another reserved configuration.

At step 312, method 300 may receive an online reconfiguration transition response message from the transmitter. The online reconfiguration transition response message may acknowledge the online reconfiguration request and may comprise the RMC frame (e.g., a normal RMC or a special RMC) that was requested in the online reconfiguration transition request message. When an online reconfiguration transition response message is not received within a specified time period or is received incorrectly, a time-out may occur and the current online reconfiguration transition request message may be abandoned. At step 314, method 300 may transition one or more transmission parameters at the time indicated by the time marker information. Transmission parameters may include, but are not limited to, a bit loading table, a gain table, and a framing parameter. The transitioning may occur substantially simultaneously between the transmitter and the receiver while the transmitter and the receiver are online (e.g., during showtime).

Figure 4:
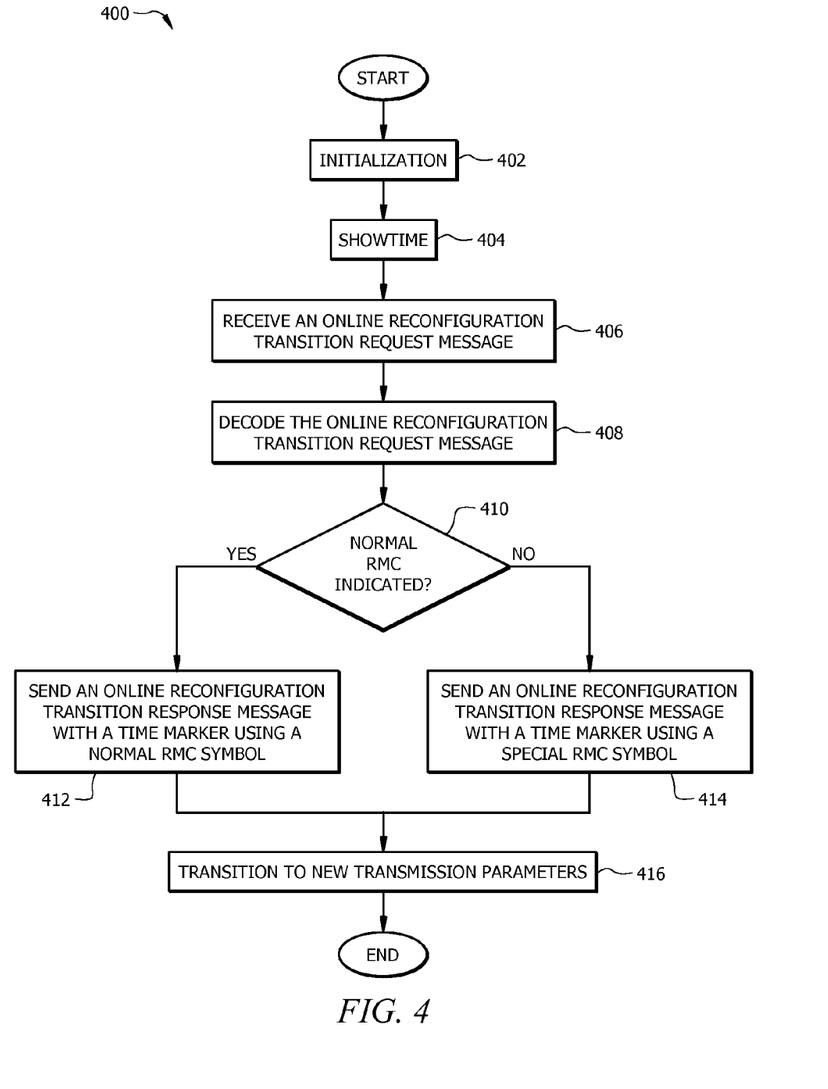
FIG. 4 is a flowchart of an embodiment of an online reconfiguration method for a transmitter.

FIG. 4 is a flowchart of an embodiment of an online reconfiguration method 400 for a transmitter and may be similar to the online reconfiguration module 260 described in FIG. 2. In an embodiment, a transmitter (e.g., G.fast DSLAM 102 described in FIG. 1) may be configured to receive an online reconfiguration transition request from a receiver (e.g., CPE 104 described in FIG. 1) and to synchronize an online reconfiguration in response to the online reconfiguration transition request. The online reconfiguration transition response message may be determined using information derived from the online reconfiguration transition request.

At step 402, method 400 may perform an initialization between the transmitter and the receiver. An initialization may comprise a handshake protocol and may introduce the transmitter and receiver. During initialization, information (e.g., modem type) may be communicated between the transmitter and receiver, channel response may be measured, channel quality (e.g., SNR) may be measured, and/or other operation for initializing data communication as would be appreciated by one of ordinary skill in the art upon viewing this disclosure. An initialization may be implemented as described in step 302 of FIG. 3. At step 404, method 400 may implement a showtime state to communicate data between the transmitter and the receiver. Showtime may be a mode (e.g., a data mode) where data is communicated between the transmitter and the receiver based on the channel quality. A showtime may be implemented as described in step 404 of FIG. 4.

At step 406, method 400 may receive an online reconfiguration transition request message from a receiver. The online reconfiguration transition request message may request to initiate an online reconfiguration transition. For instance, the receiver may request to reduce a bit loading table. The online reconfiguration transition request message may comprise an indicator field that identifies an RMC frame type to be used for synchronizing an online reconfiguration transition. At step 408, method 400 may decode the online reconfiguration transition request message to determine the time mark type indicated by the online reconfiguration transition request. Decoding the online reconfiguration transition message may comprise parsing the online reconfiguration transition message, checking an identifier field (e.g., an identifier field as described in step 310 of FIG. 3), and/or using a mapping between a sub-carrier modulation and an RMC frame type. The RMC frame type may include, but is not limited to, a normal RMC, a special RMC, and a Syncflag. At step 410, method 400 may determine if the online reconfiguration transition request message indicates to use a normal RMC frame that comprises time marker information. Determining if the online reconfiguration transition request message indicates to use a normal RMC frame that comprises time marker information may comprise using an identifier field value or a sub-carrier modulation and a mapping between the identifier field value or the sub-carrier modulation and an RMC frame type. When the online reconfiguration transition request message indicates to use a normal RMC frame that comprises time marker information, method 400 may proceed to step 412; otherwise, method 400 may proceed to step 414. At step 412, method 400 may send an online reconfiguration transition response message to the receiver that comprises the requested normal RMC frame. For example, the online reconfiguration transition response message may be configured similar to the G.fast super frame 502 described in FIG. 5.

Returning to step 410, when the online reconfiguration transition request message does not indicate to use a normal RMC frame that comprises time marker information. At step 414, method 400 may send an online reconfiguration transition response message to the receiver that comprises the requested special RMC frame. Alternatively, method 400 may send an online reconfiguration transition response message to the receiver that comprises any other requested RMC frame that comprises time marker information as would be appreciated by one of ordinary skill in the art upon viewing this disclosure. At step 416, method 400 may transition one or more transmission parameters at the time indicated by the time marker information. The transitioning may occur substantially simultaneously between the transmitter and the receiver while the transmitter and the receiver are online (e.g., during showtime).

Figure 5:
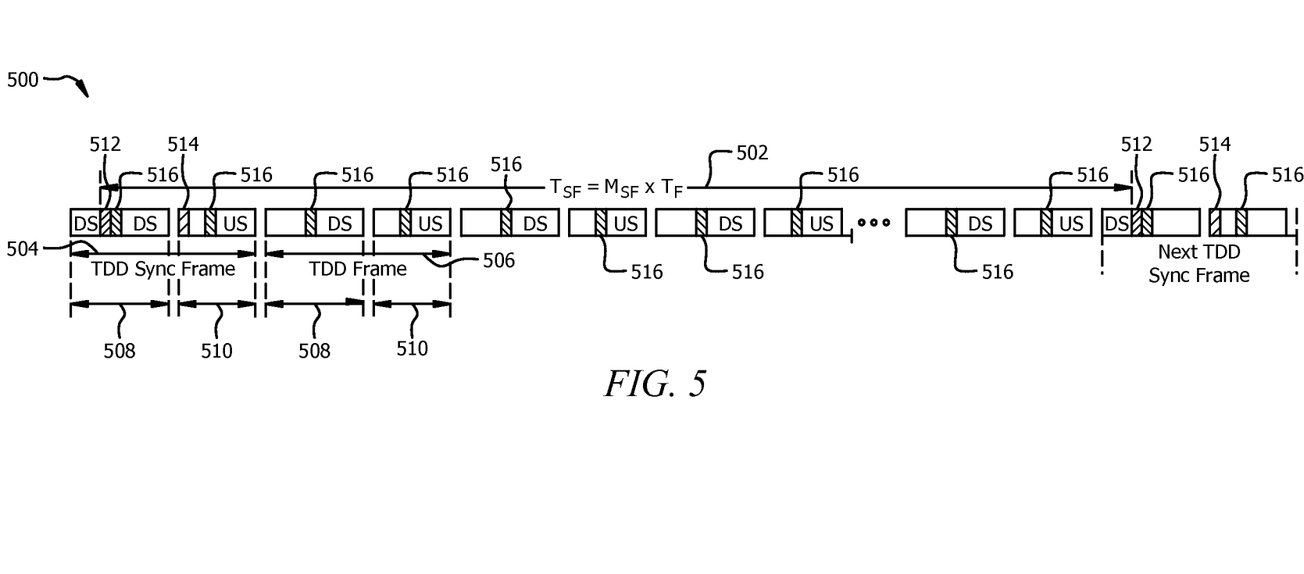
FIG. 5 is a timing diagram of an embodiment of a G.fast super frame.

FIG. 5 is a timing diagram 500 of an embodiment of a G.fast super frame 502. A G.fast super frame 502 may be employed as online reconfiguration transition response message and may be sent by a transmitter as described in step 312 in FIG. 3. Super frame 502 comprises a TDD sync frame 504 followed by a plurality of TDD frames 506. A super frame 502 may have a period $T_{SF}$ that may be about equal to one plus the number $M_{SF}$ of TDD frames 506 within the super frame 502 times the period $T_F$ of a TDD frame 506. Each of the TDD sync frames 504 and the TDD frames 506 may comprise a plurality of non-overlapping downstream (DS) DMT symbols 508 and upstream (US) DMT symbols 510. A DS DMT symbol 508 for a TDD sync frame 504 may comprise a DS sync symbol 512, a RMC symbol 516, and a plurality of data symbols. A data symbol may be a data transfer unit (DTU) and may comprise data content. The RMC symbol 516 may comprise a time marker field which may indicate to use a normal RMC frame or a special RMC frame. The DS sync symbol 512 may be transmitted immediately before the RMC symbol 516. The DS sync symbols 512 may also serve as a delimiter for adjacent super frames 502. A US DMT symbol 510 for a TDD sync frame 504 may comprise a US sync symbol 514, a RMC symbol 516, and a plurality of data symbols. The US sync symbol 514 may be transmitted on the first symbol position of the US DMT symbols 510. A DS DMT symbol 508 for a TDD frame 506 may comprise a RMC symbol 516 and a plurality of data symbols. A US DMT symbol 510 for a TDD frame 506 may comprise a RMC symbol 516 and a plurality of data symbols.

Figure 6:
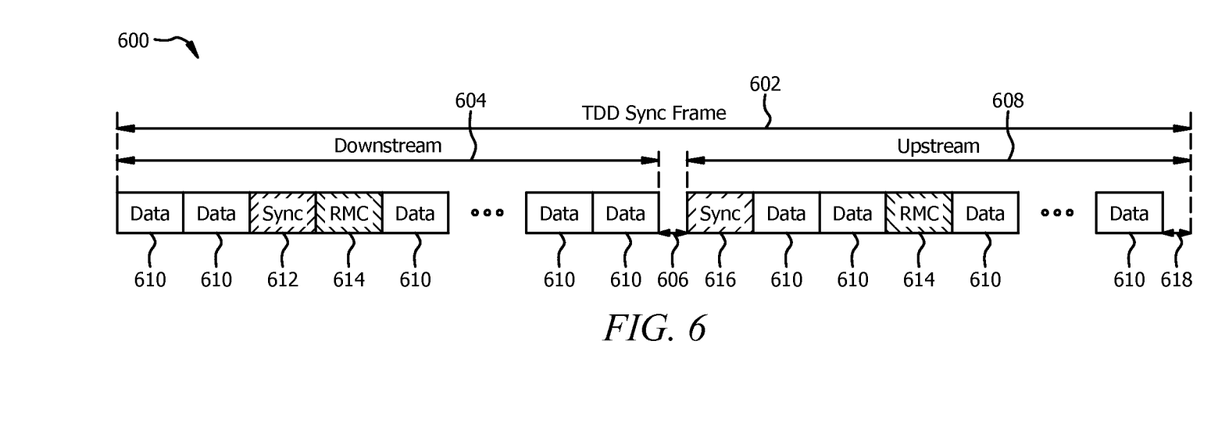
FIG. 6 is a timing diagram of an embodiment of a TDD sync frame.

FIG. 6 is a timing diagram 600 of an embodiment of a TDD sync frame 602. TDD sync frame 602 may be substantially similar to TDD sync frame 504 described in FIG. 5 and may be sent by a transmitter as described in step 312 in FIG. 3. The TDD sync frame 602 may comprise DS DMT symbol 604 and US DMT symbol 608. The DS DMT symbol 604 and the US DMT symbol 608 may not be overlapping and may be separated by a latency period 606. The DS DMT symbol 604 may comprise a plurality of data symbols 610, a DS sync symbol 612, and a RMC symbol 614. A data symbol 610 may be a DTU and may comprise data content. The RMC symbol 614 may indicate to use a normal RMC frame or a special RMC frame. The US DMT symbol 608 may comprise a US sync symbol 616, a plurality of data symbols 610, and a RMC symbol 614. The US DMT symbol 608 may be followed by a second latency 618 to avoid overlapping with subsequent frames (e.g., TDD frames).

Figure 7:
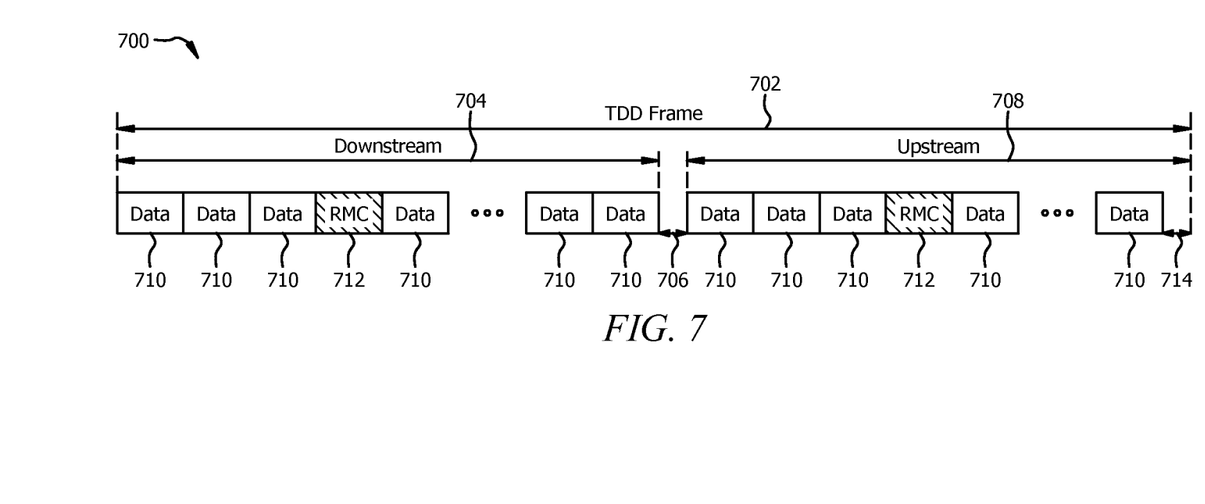
FIG. 7 is a timing diagram of an embodiment of a TDD frame.

FIG. 7 is a timing diagram 700 of an embodiment of a TDD frame 702. TDD frame 702 may be substantially similar to TDD frame 506 described in FIG. 5 and may be sent by a transmitter as described in step 312 in FIG. 3. The TDD frame 702 may comprise DS DMT symbol 704 and US DMT symbol 708. The DS DMT symbol 704 and the US DMT symbol 708 may not be overlapping and may be separated by a latency period 706. The DS DMT symbol 704 may comprise a plurality of data symbols 710 and a RMC symbol 712. A data symbol 710 may be a DTU and may comprise data content. The RMC symbol 712 may indicate to use a normal RMC frame or a special RMC frame. The US DMT symbol 708 may comprise a plurality of data symbols 710 and a RMC symbol 712. The US DMT symbol 708 may be followed by a second latency 714 to avoid overlapping with subsequent frames (e.g., TDD frames).

Figure 8:
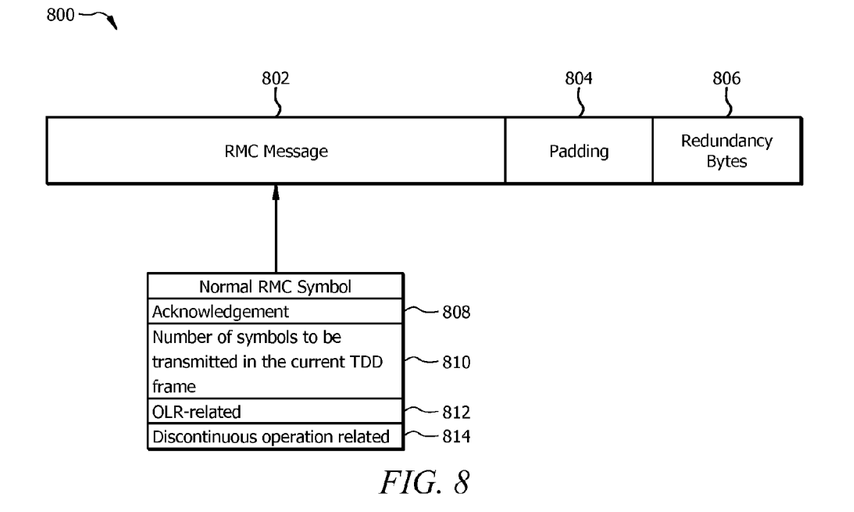
FIG. 8 is a schematic diagram of an embodiment of a normal RMC frame.

FIG. 8 is a schematic diagram of an embodiment of a normal RMC frame 800. The normal RMC frame 800 may be used in an RMC frame for a TDD frame (e.g., a RMC symbol 516 in a TDD sync frame 504 or TDD frame 506 described in FIG. 5). A normal RMC frame 800 may comprise acknowledgement data and management or control data. The normal RMC frame 800 may comprise an RMC message field 802, a padding field 804, and a redundancy bytes field 806. The RMC message field 802 may comprise a plurality of message fields 808-814. A first message field 808 may comprise a DTU acknowledgement. A second message field 810 may indicate the number of symbols to be transmitted in the current TDD frame. A third message field 812 may comprise OLR related information. For example, the OLR related information may include, but is not limited to, an OLR command, an OLR response, time marker information, or synchronization information. A fourth message field 814 may comprise discontinuous operation related information. In an alternative embodiment, one or more fields or message fields may be omitted and/or any other suitable fields may be included in the normal RMC frame 800 as would be appreciated by one of ordinary skill in the art upon viewing this disclosure. Additional information for a normal RMC frame 800 may be as described in ITU draft G.9701 entitled, "Fast Access to Subscriber Terminals (FAST)—Physical layer specification."

Figure 9:
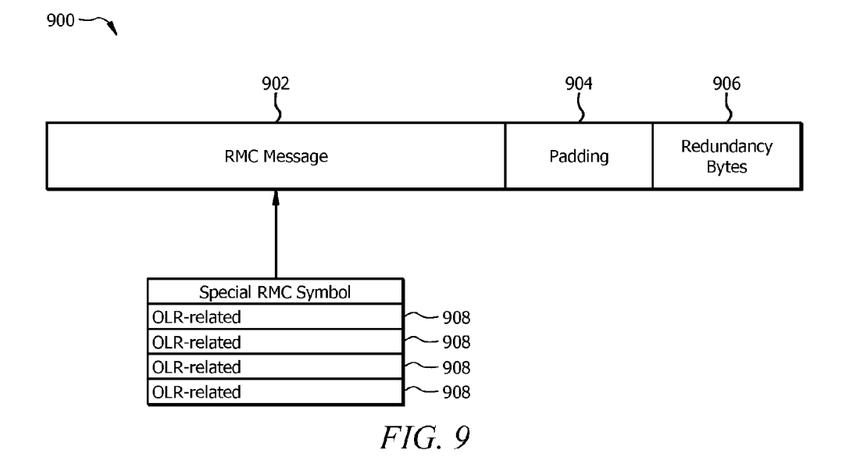
FIG. 9 is a schematic diagram of an embodiment of a special RMC frame.

FIG. 9 is a schematic diagram of an embodiment of a special RMC frame 900. The special RMC frame 900 may be used in an RMC frame for a TDD frame (e.g., a RMC symbol 516 in a TDD sync frame 504 or TDD frame 506 described in FIG. 5). A special RMC frame may be configured to convey time marker information for an OLR transition and may not be a DTU or comprise data content. The special RMC frame 900 may be configured to be implemented using noise protection and/or using redundancy (e.g., repetitions). A special RMC frame 900 may comprise an RMC message field 902, a padding field 904, and a redundancy bytes field 906. The RMC message field 902 may comprise one or more message fields 908. One or more of the message fields 908 may comprise OLR related information. The OLR related information may include, but is not limited to, an OLR command, an OLR response, a time indicator, or synchronization information. For example, all of the message fields 908 may comprise OLR transition time marker information. In an embodiment, the special RMC frame 900 may not comprise management or control data. In an alternative embodiment, one or more fields may be omitted and/or any other suitable fields may be included in the special RMC frame 900 as would be appreciated by one of ordinary skill in the art upon viewing this disclosure.

Figure 10:
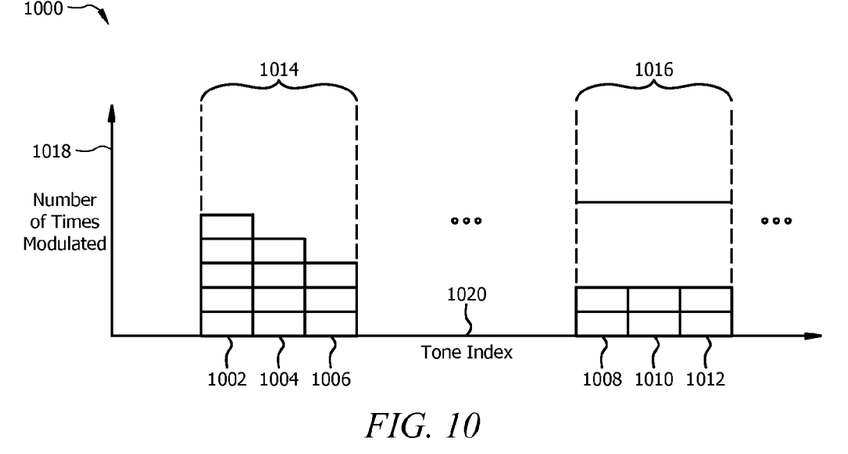
FIG. 10 is a timing diagram of an embodiment of a special RMC frame.

FIG. 10 is a timing diagram 1000 of an embodiment of a special RMC frame. In timing diagram 1000, the vertical axis 1018 corresponds with the number of times a bit is loaded or modulated and the horizontal axis 1020 corresponds with a tone index (e.g., a plurality of RMC sub-carriers). The special RMC frame may comprise time marker information and may be used in an RMC frame for a TDD frame (e.g., RMC symbol 516 in a TDD sync frame 504 or TDD frame 506 described in FIG. 5). Timing diagram 1000 illustrates a first special RMC message 1014 and a second special RMC message 1016. In such an embodiment, the second special RMC message 1016 may be configured as a copy of the first special RMC message 1014. The first special RMC message 1014 comprises a plurality of tones or sub-carriers 1002-1006 and the second special RMC message 1016 comprises a plurality of tones or sub-carriers 1008-1012. Each tone 1002-1012 may comprise one or more bits and may be modulated one or more times. For example, a tone k may modulate m number of bits or may modulate one bit m number of times. Each tone 1002-1012 may have different bit loading tables and may modulate a bit a different number of times. In an embodiment, a tone table may be expressed as:

$$(t_0, t_1, t_2, \ldots, t_{NSC_{RMC}-3}, t_{NSX_{RMC}-2}, t_{NSC_{RMC}-1}),$$

where $NSC_{RMC}$ is the number of RMC tones. A bit loading table may indicate the number of bits modulated into each tone or sub-carrier. A corresponding bit loading table may be expressed as:

$$(b_0, b_1, b_2, \ldots, b_{NSC_{RMC}-3}, b_{NSX_{RMC}-2}, b_{NSC_{RMC}-1}),$$

For example, when a vector of the bit loading table is (5, 4, 3, ..., 2, 2, 2), a special RMC message may be encoded as 101, such that, a first bit is encoded as a one, a second bit is encoded as a zero, and a third bit is encoded as a one. The first bit may be loaded onto tone 1002 and may be repeated five times by $b_0$. The second bit may be loaded onto tone 1004 and may be repeated four times by $b_1$. The third bit may be loaded onto tone 1006 and may be repeated three times by $b_2$. After modulating the first special RMC message 1014, one or more copies of the RMC message may be loaded onto the remaining RMC tones. The first bit may be loaded onto tone 1008 (e.g., tone $t_{NSC_{RMC}-3}$) and may be repeated two times by $b_{NSC_{RMC}-3}$. The second bit may be loaded onto tone 1010 (e.g., tone $t_{NSC_{RMC}-2}$) and may be repeated two times by $b_{NSC_{RMC}-2}$. The third bit may be loaded onto tone 1012 (e.g., tone $t_{NSC_{RMC}-1}$) and may be repeated two times by $b_{NSC_{RMC}-1}$. In another embodiment, an RMC message may comprise about one bit of information and may be modulated to ensure an adequate noise margin. Following the modulation of the RMC message, the RMC message may be copied to one or more other RMC tones to be modulated. Timing diagram 1000 is provided for illustrative purposes and may be modified and/or reconfigured to comprise any other encoding, bit loading vector, bit loading table, number of special RMC messages, RMC tones, RMC sub-carriers, number bit modulations, or combinations thereof as would be appreciated by one of ordinary skill in the art upon viewing this disclosure.

Figure 11:
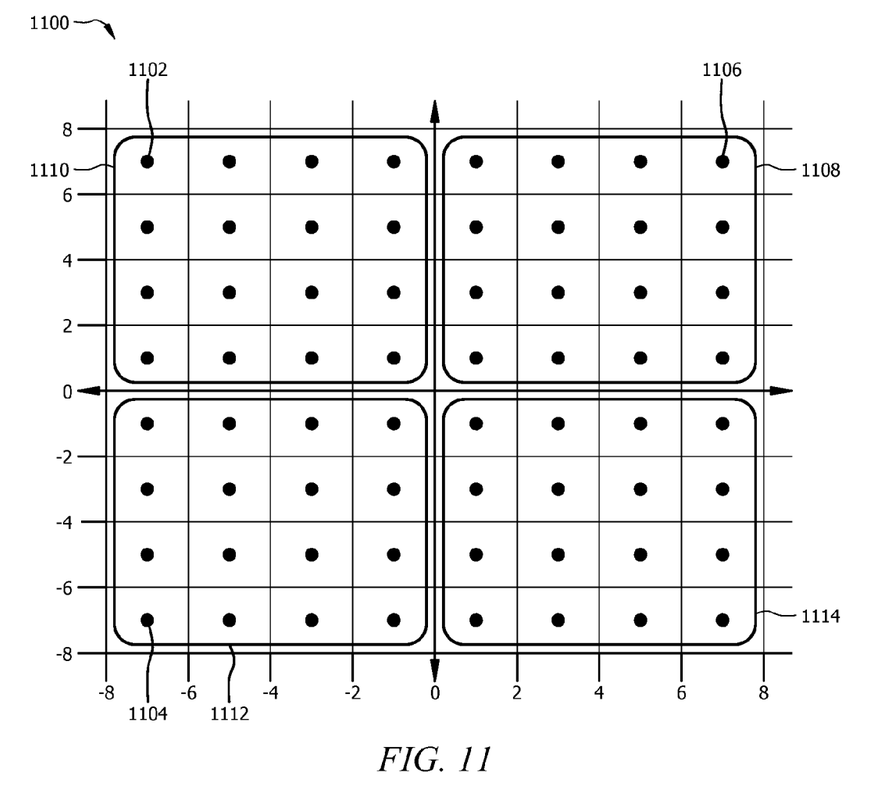
FIG. 11 is constellation map of an embodiment of a special RMC frame.

FIG. 11 is constellation map 1100 of an embodiment of a special RMC frame. The special RMC frame may comprise time marker information and may be used in an RMC frame in a TDD frame (e.g., a RMC symbol 516 in a TDD sync frame 504 or TDD frame 506 described in FIG. 5). The constellation map 1100 comprises a plurality of constellation points 1102 within a first quadrant 1108, a second quadrant 1110, a third quadrant 1112, and a fourth quadrant 1114. The constellation map 1100 may be a r quadrature amplitude modulation (QAM) constellation map for a bit loading table of tone k with m bits. For example, the constellation map 1100 may comprise a bit loading table for about six bits and may be a 64 QAM constellation map. In an embodiment, the special RMC frame may be encoded and/or decoded according to the bit loading table of the RMC tones. One or more constellation points in the first quadrant 1108 (e.g., constellation point 1106) may represent a value of zero and one or more points in the third quadrant 1112 (e.g., constellation point 1104) may represent a value of one. When a special RMC message is encoded as 101, the first bit may be loaded onto the 4$^{th}$ tone with a bit loading of about 6 bits and the 48$^{th}$ constellation point (e.g., constellation point 1104) in the third quadrant 1112 may be selected to represent a value of one. Alternatively, a value of one may be represented by a first set of one or more constellation points in any one of the first quadrant 1108, the second quadrant 1110, the third quadrant 1112, or the fourth quadrant 1114 and a value of zero may be represented by a second set of one or more constellation points in any one of the remaining quadrants. In another embodiment, the special RMC frame may be one bit (e.g., having a value of a one or a zero) and may be encoded and/or decoded based on the quadrant of the constellation point for each RMC tone. For example, the first quadrant 1108 may represent a value of zero and the third quadrant 1112 may represent a value of one. Alternatively, a value of one may be represented by any one of the first quadrant 1108, the second quadrant 1110, the third quadrant 1112, or the fourth quadrant 1114 and a value of zero may be represented by any one of the remaining quadrants. In yet another embodiment, a bit value of zero may be mapped to a first half of the constellation map 1100 and a bit value of one may be mapped to a second half of the constellation mapping. For example, a bit value of zero may be mapped to a first half that comprises the first quadrant and the second quadrant and a bit value of one may be mapped to a second half that comprises the third quadrant and the fourth quadrant. The bit value of zero may be mapped to any half of the quadrant mapping 1100 and the bit value of one may be mapped to the remaining half of the quadrant mapping 1100. Additionally, the bit value of zero may be mapped to one or more constellation points in the first half of the constellation mapping 1100 and the bit value of one may be mapped to one or more constellation points in the second half of the constellation mapping 1100.

In another embodiment, the special RMC frame may be implemented by using an FEC codeword that comprises additional redundancy bytes to encode the OLR transition time marker information. A special RMC FEC codeword may comprise additional encoded bytes and fewer data bytes than a normal RMC FEC codeword. A normal RMC frame and a special RMC frame may use an RS FEC codeword represented as RS(k,n), where k indicates the total number of bytes (e.g., encoded bytes and data bytes) and n indicates the number of data bytes. For example, an RS FEC codeword encoding for a normal RMC frame may be represented as RS(48, 32) and the RS FEC codeword encoding may be changed from RS(48, 32) to RS(48, 16) for a special RMC frame. In an embodiment, a valid combination for FEC codeword parameters of a special RMC frame may be selected to provide error detection capabilities equivalent to about at least the error detection capabilities of the normal RMC frame. For example, a valid combination of FEC codeword parameters of a special RMC frame may provide error detection capabilities of about at least 32 bit CRC or about double the error detection capabilities of the normal RMC frame to provide more than 32 bit CRC error detection capability. Additionally or alternatively, an FEC codeword for a special RMC frame may comprise redundancy bytes. For instance, redundancy bytes may be inserted after every k data bytes starting from the first byte of the FEC codeword.

In yet another embodiment, the special RMC frame may be implemented using a syncflag. A syncflag may comprise one or more sync symbols in which the sync frame bits are modulated on flag tones that are inverted relative to the sync frame modulated by the most recently transmitted sync symbol. For example, if the previous sync frame was substantially all zeros, then the syncframe may correspond to a sync frame of substantially all ones modulated on flag tones, and vice-versa. A flag tone may be a sub-carrier with an index value equal to about 10n+1 or 10n+7, where n is an integer value. Alternatively, a flag tone may be another other suitable sub-carrier index value as would be appreciated by one of ordinary skill in the art upon viewing this disclosure. Additional information for a syncflag may be as described in ITU standard G.993.5 entitled, "Self-FEXT cancellations (vectoring) for use with VDSL2 transceivers" which is hereby incorporated by reference as if reproduced in its entirety.

It is noted that one or more of the previously described embodiments may be combined as would be appreciated by one of ordinary skill in the art upon viewing this disclosure.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, e.g., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed:

1. An online reconfiguration method comprising:
   communicating data transfer units (DTUs) using a subscriber line;
   monitoring the subscriber line for a line condition event;
   detecting the line condition event, wherein detecting the line condition event comprises determining whether the line condition triggers a threshold;
   sending an online reconfiguration request message that indicates a robust management channel (RMC) frame type in response to detecting the line condition event, wherein the RMC frame type is a normal RMC frame that comprises time marker information when the line condition event does not trigger the threshold, and wherein the RMC frame type is a special RMC frame that comprises time marker information when the line condition event triggers the threshold;
   receiving an online reconfiguration response message that comprises the time marker information in response to the online reconfiguration request message; and
   synchronizing a transition of one or more transmission parameters using the time marker information, and
   wherein the special RMC frame includes a bit value, wherein the bit value in the special RMC frame is mapped to a constellation point in a first half of a constellation mapping when the bit value is zero, and wherein the bit value in the special RMC frame is mapped to a constellation point in a second half of the constellation mapping when the bit value is one.

2. The method of claim 1, wherein the line condition event comprises a signal-to-noise ratio (SNR) degradation.

3. The method of claim 1, wherein the line condition event comprises a reduction of a signal-to-noise ratio (SNR) margin.

4. The method of claim 1, wherein the line condition event comprises a cyclic redundancy check (CRC) anomaly.

5. The method of claim 1, wherein the line condition event comprises a cyclic redundancy check (CRC) anomaly increase.

6. The method of claim 1, wherein the line condition event comprises a cyclic redundancy check (CRC) anomaly decrease.

7. The method of claim 1, wherein the normal RMC frame comprises a first forward error coded (FEC) codeword and the special RMC frame comprises a second FEC codeword, and wherein the second FEC codeword comprises more redundancy bytes than the first FEC codeword.

8. The method of claim 1, wherein the line condition event comprises a signal-to-noise ratio (SNR) enhancement.

9. The method of claim 1, wherein the line condition event comprises an increase of a signal-to-noise ratio (SNR) margin.

10. The method of claim 1, wherein the special RMC frame comprises a modulated one bit message on a first RMC tone, wherein the modulated one bit message is modulated one or more times according to a bit loading table, and wherein the modulated one bit message is repeated one or more times on another RMC tone.

11. An online reconfiguration method comprising:
    communicating data transfer units (DTUs) using a subscriber line;
    monitoring the subscriber line for a line condition event;
    detecting the line condition event, wherein detecting the line condition event comprises determining whether the line condition triggers a threshold;
    sending an online reconfiguration request message that indicates a robust management channel (RMC) frame type in response to detecting the line condition event, wherein the RMC frame type is a normal RMC frame that comprises time marker information when the line condition event does not trigger the threshold, and wherein the RMC frame type is a special RMC frame that comprises time marker information when the line condition event triggers the threshold;
    receiving an online reconfiguration response message that comprises the time marker information in response to the online configuration request message; and
    synchronizing a transition of one or more transmission parameters using the time marker information
    wherein the special RMC frame includes a bit value, wherein the bit value in the special RMC frame is mapped to a first half of a constellation mapping when the bit value is zero, and wherein the bit value in the special RMC frame is mapped to a second half of the constellation mapping when the bit value is one.

12. An apparatus comprising:
    a transceiver configured to couple to one or more subscriber lines; and
    a processor coupled to a memory and the transceiver, wherein the memory comprises computer executable instructions stored in a non-transitory computer readable medium such that when executed by the processor causes the processor to:
    monitor the subscriber lines for a line condition event;
    detect the line condition event;
    determine when the line condition event triggers a threshold;
    send an online reconfiguration request message that requests a normal robust management channel (RMC) frame that comprises time marker information when the determination indicates that the line condition event does not trigger the threshold;
    send the online reconfiguration request message that requests a special RMC frame that comprises time marker information when the determination indicates that the line condition event triggers the threshold;
    receive an online reconfiguration response message that comprises one of the normal RMC frame or the special RMC frame; and
    synchronize a transition of one or more transmission parameters using the time marker information.

13. The apparatus of claim 12, wherein monitoring the subscriber lines comprises monitoring a signal-to-noise ratio (SNR) for the subscriber line.

14. The apparatus of claim 12, wherein monitoring the subscriber lines comprises monitoring for a cyclic redundancy check (CRC) anomaly.

15. The apparatus of claim 12, wherein the apparatus is configured to synchronize the transition of one or more transmission parameters using the time marker information when the apparatus is communicating data transfer units (DTUs).

16. The apparatus of claim 12, wherein the normal RMC frame comprises a first forward error coded (FEC) codeword and the special RMC frame comprises a second FEC codeword, wherein the first FEC codeword and the second FEC codeword comprise the same number of bytes, and wherein the second FEC codeword comprises more encoded bytes than the first FEC codeword.

17. An apparatus comprising:
a transceiver configured to couple to one or more subscriber lines; and
a processor coupled to a memory and the transceiver, wherein the memory comprises computer executable instructions stored in a non-transitory computer readable medium such that when executed by the processor causes the processor to:
receive an online reconfiguration request message that indicates a robust management channel (RMC) frame type,
wherein the RMC frame type is one of a normal RMC frame or a special RMC frame;
decode the online reconfiguration request message to determine the RMC frame type;
send, after the decoding, an online reconfiguration response message that comprises an RMC frame of the RMC frame type, wherein the RMC frame comprises time marker information; and
synchronize a transition of one or more transmission parameters using the time marker information.

18. The apparatus of claim 17, wherein the apparatus comprises computer executable instructions that, when executed by the processor causes a network node to map a bit value of zero and a bit value of one in the special RMC frame to a constellation mapping.

19. The apparatus of claim 17, wherein the special RMC frame comprises a modulated one bit message, wherein the modulated one bit message is modulated according to a bit loading table, and wherein the modulated one bit message is repeated one or more times on another RMC tone.

20. The apparatus of claim 17, wherein the special RMC frame comprises a time indicator, and wherein the special RMC frame does not comprise control data.

21. The apparatus of claim 17, wherein the normal RMC frame comprises a first forward error coded (FEC) codeword and the special RMC frame comprises a second FEC codeword, wherein the first FEC codeword and the second FEC codeword comprise the same number of bytes, and wherein the second FEC codeword comprises more encoded bytes than the first FEC codeword.

22. An online reconfiguration method comprising:
communicating data transfer units (DTUs) using a subscriber line;
monitoring the subscriber line for a line condition event;
detecting the line condition event, wherein detecting the line condition event comprises determining whether the line condition triggers a threshold;
sending an online reconfiguration request message that indicates a robust management channel (RMC) frame type in response to detecting the line condition event, wherein the RMC frame type is a normal RMC frame that comprises time marker information when the line condition event does not trigger the threshold, and wherein the RMC frame type is a special RMC frame that comprises time marker information when the line condition event triggers the threshold;
receiving an online reconfiguration response message that comprises the time marker information in response to the online reconfiguration request message; and
synchronizing a transition of one or more transmission parameters using the time marker information,
wherein the special RMC frame comprises a first special RMC message and a second special RMC message each including a plurality of tones, and wherein the second special RMC message is configured as a copy of the first special RMC message.

* * * * *